T. Bisbing.
Measuring Instrument.
Nº 87,134. Patented Feb. 23, 1869.
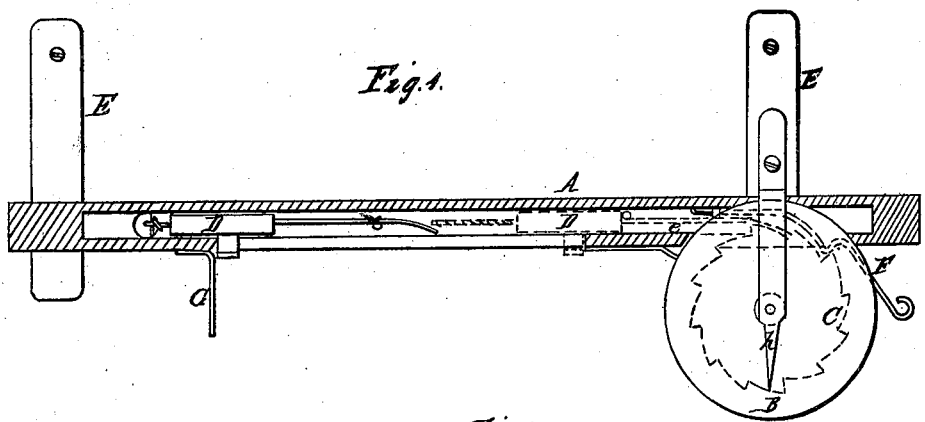
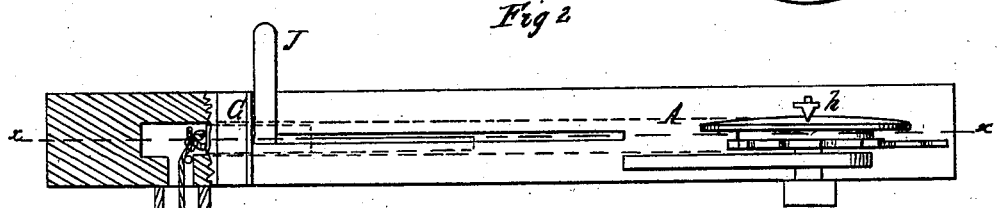
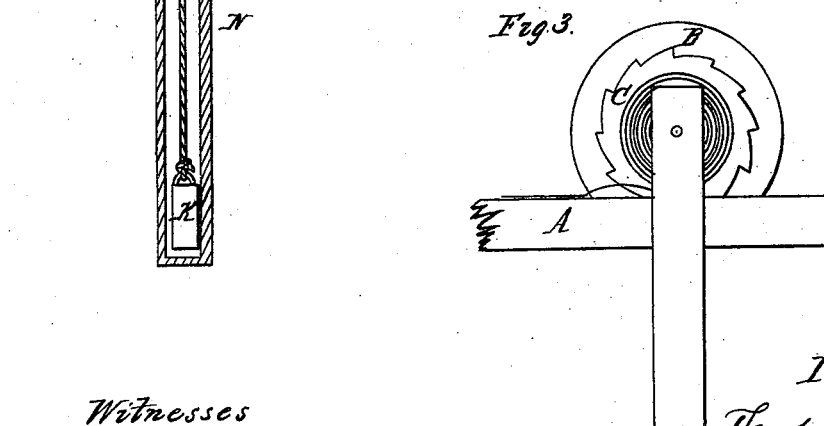
Witnesses
H. C. Ashkettle
Wm A Morgan
Inventor
Thos Bisbing
per Munn & Co
Attorneys

THOMAS BISBING, OF BUCKSTOWN, PENNSYLVANIA, ASSIGNOR TO HIMSELF AND M. V. SORBER, OF SAME PLACE.

Letters Patent No. 87,134, dated February 23, 1869.

IMPROVEMENT IN APPARATUS FOR MEASURING CLOTH, &c.

The Schedule referred to in these Letters Patent and making part of the same.

*To all whom it may concern:*

Be it known that I, THOMAS BISBING, of Buckstown, in the county of Somerset, and State of Pennsylvania, have invented a new and improved Measuring-Instrument; and I do hereby declare that the following is a full, clear, and exact description thereof, which will enable others skilled in the art to make and use the same, reference being had to the accompanying drawings, forming part of this specification.

This invention relates to a new and improved device for measuring cloth, and giving lineal measurements generally; and The invention consists in operating a revolving dial-plate by a sliding pawl and ratchet-wheel, and in the general construction and arrangement of parts, as hereinafter described.

Figure 1 is a longitudinal section of the instrument through the line x-x of fig. 2.

Figure 2 represents the instrument as it appears when attached to the counter, or to a table, ready for use.

Figure 3 is a detached view of the dial-plate and ratchet.

Similar letters of reference indicate corresponding parts.

This instrument is designed to be used in retail-stores, for measuring dry-goods, and in all places where it is applicable; and it operates so that the length measured is denoted on the revolving plate by an index-finger.

A is the slotted frame, to which the working-parts of the instrument are attached.

B is the revolving dial, or index-plate.

C is a ratchet-wheel, attached to the dial-plate.

D is a slide within the slotted frame A, which has a spring-pawl attached to it, as seen at e, by which the ratchet and dial-plate are operated.

E E are arms, attached to the frame A, by which the instrument is secured to the counter.

F is a spring, which bears against the ratchet, to keep the dial-plate in place.

G is a fixed starting-point on the frame A.

The top of the frame is marked off so as to indicate one yard, and fractions of a yard, the yard-measure being at a point where the pawl e will act upon the ratchet and turn the dial-plate one tooth, so as to indicate one figure on the plate.

The figures on the plate pass under the index-finger h, and run from one yard upward, so that every measurement of a yard or more is indicated on the plate.

J is a piece attached to the slide D, by which the slide is operated, and projects up from the frame, as seen in the drawing.

The slide is drawn back by a weight, K, which is connected with the slide by a cord, m.

The weight is confined in a hollow pendent tube, N, attached to the frame, as seen in the drawing.

Having thus described my invention,

What I claim as new, and desire to secure by Letters Patent, is—

1. The frame A, the slide D, the dial-plate B, and the ratchet-wheel C, constructed, combined, and operating substantially as described, for the purposes set forth.

2. The weight K, arranged to operate in connection with the frame A, slide D, dial-plate B, and ratchet-wheel C, as herein described, for the purpose specified.

The above specification of my invention signed by me, this 22d day of January, 1868.

THOMAS BISBING.

Witnesses:
L. C. ACKERMANE,
M. V. SORBER.